US006965598B1

(12) United States Patent
Yi

(10) Patent No.: US 6,965,598 B1
(45) Date of Patent: Nov. 15, 2005

(54) SIGNAL TRAFFIC ROUTING METHOD FOR A SIGNALING NETWORK

(75) Inventor: Seung-Hee Yi, Kyungki-Do (KR)

(73) Assignee: LG Information & Communications Ltd., Seoul (KR)

( * ) Notice: Subject to any disclaimer, the term of this patent is extended or adjusted under 35 U.S.C. 154(b) by 0 days.

(21) Appl. No.: 09/518,695

(22) Filed: Mar. 3, 2000

(30) Foreign Application Priority Data

May 6, 1999 (KR) .............................. 1999-16232

(51) Int. Cl.⁷ ........................................... H04L 12/26
(52) U.S. Cl. ........................ 370/392; 370/522; 379/230
(58) Field of Search ............................... 370/351, 352, 370/357, 360, 386–392, 395.1, 396, 397, 370/395.2–395.5, 522, 524; 379/230

(56) References Cited

U.S. PATENT DOCUMENTS

| 5,544,154 | A | * | 8/1996 | Glitho ........................ 370/248 |
| 5,615,254 | A | * | 3/1997 | Qiu et al. .............. 379/221.01 |
| 5,907,586 | A | * | 5/1999 | Katsuragawa et al. ...... 370/342 |
| 5,930,348 | A | * | 7/1999 | Regnier et al. ............. 370/232 |
| 5,953,316 | A | * | 9/1999 | Lazar et al. ................ 370/230 |
| 6,393,484 | B1 | * | 5/2002 | Massarani ................... 709/227 |
| 6,603,769 | B1 | * | 8/2003 | Thubert et al. ............. 370/401 |

OTHER PUBLICATIONS

"Series Q: Switching and Signalling Specifications of Signalling System No. 7—Message transfer part", International Telecommunication Union—T Series Q.704, Jul. 1996.

* cited by examiner

Primary Examiner—Melvin Marcelo
(74) Attorney, Agent, or Firm—Fleshner & Kim, LLP

(57) ABSTRACT

A signal traffic routing method for a signaling network, for example, a No. 7 signaling network, includes analyzing a signal message when a message transfer unit receives a signal message and determining a route of a final destination of the received signal message, selecting a link for transferring a signal message at a link set of the thusly determined route based on a link determination history and link determination data, updating the link determination history and link determination data based on the selected link, and transferring a signal message through the selected link, thereby enhancing an availability and performance of the signaling network by distributing a signal traffic to all available link of a link set. The message transfer unit preferably comprises a message discrimination unit, a message distribution unit and a message routing unit that distributes a signal traffic to an available route at each signal transfer point.

6 Claims, 4 Drawing Sheets

SIGNAL TRANSFER POINT ADD A SPACE(A~F)

SLS; SIGNALING LINK SELECTION

SIGNAL TRAFFIC ROUTING METHOD FOR A SIGNALING NETWORK

BACKGROUND OF THE INVENTION

1. Field of the Invention

The invention relates to a signal traffic routing method for a signaling network, and in particular to a signal traffic routing method for a No. 7 signaling network.

2. Background of the Related Art

Generally, a No. 7 signaling system is a signaling method which is recommended by the ITU in a communication standard Q.70X. Namely, the above-described No. 7 signaling system is a common channel signaling (CCS) method which fully separates a communication route and a signaling route. The CSS method thereby transmits and receives a plurality of voice signals through an independent channel differently from a conventional method in which the communication route and signaling route are co-used.

At a signal transfer point of a No. 7 signaling network, a signal traffic is distributed to available routes based on a certain load sharing method and is distributed to available links of a link set of a corresponding route. The above-described signal traffic is routed based on a 4-bit (0000~1111) SLS (Signaling Link Selection) field, a 14-bit originating point code, and a destination point code.

In a method for distributing a signal traffic to a link of the link set, the signal traffic is distributed based on a SLS value in a routing label of a signal message with respect to each available link. At this time, a SLS value which is available for the signal message is 16 of 4-bit (0000~111111) in maximum, and each link transfers a signal traffic having a certain SLS.

FIG. 1 schematically illustrates a No. 7 signaling network. As shown therein, there are six signal transfer points from a first signal point A to a sixth signal point F. Each signal transfer point corresponds to a switch or node.

FIG. 2 schematically illustrates that the standard routing label message has a length of 32 bits.

As shown in FIG. 2, the Destination Point Code (DPC) indicates the destination point of the message. The Origination point code (OPC) indicates the originating point of the message. The coding of these codes is in pure binary. Within each field, the least significant bit occupies the first position and is transmitted first. And the signaling link selection (SLS) filed is used, where appropriate, in performing load sharing.

Assuming that all link sets of the No. 7 signaling network are available, and at least two available links are provided from a certain signal point to the next signal point for a transfer of a signal message in the No. 7 signaling network of FIG. 1, the operation of the system is performed as follows.

First, a link setting method of a conventional signaling network will be explained. When a signal traffic is generated between the first signal point A to the sixth signal point F of a corresponding No. 7 signaling network, a traffic routing operation is performed in a sequence that a certain routine is first determined, and a link for an actual transmission of a signal message is determined.

In the normal state, the traffic routing operation is performed based on four signal routes: A->B->D->F, A->B->E->F, A->C->D->F and A->C->E->F which are the optimum signal routes from a signal point A to a signal point F. The routes which are formed through more than four signal transfer points are not obtained in the normal state.

As shown in FIG. 1, the routing of the signal traffic is determined from the first signal point A to the sixth signal point F. There are two available links at the link set from the first signal point to a neighboring signal point. The first link is set so that the SLS transfers a signal message of 0000~0111, and the second link is set so that the SLS transfers a signal message of 1000~1111.

When a traffic in which the SLS value is 0000~0111 is transferred to the signal point A of the assumed No. 7 signaling network, a signal message routing is performed only for the first link based on a load distribution of the link set, and the signal message routing is not actually performed for the second link. In the related art, since the SLS of the signal message is previously defined and is used, even when more than two links are available in the link set, a signal traffic is concentrated on a certain link (for example, the first link), the availability and reliability of the link are significantly decreased in the No. 7 signaling network. The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Accordingly, it is an object of the invention to provide a signal traffic routing method for a signaling network, for example, a No. 7 signaling network, which makes it possible to enhance an availability and performance of the signaling network.

It is another object of the invention to uniformly distribute a signal traffic to an available link set of a signaling network, for example, a No. 7 signaling network.

It is a further object of the invention to uniformly distribute a signal traffic to all available links of a link set of a signaling network, for example, a No. 7 signalling network.

To achieve the above objects, there is provided a method according to a preferred embodiment of the invention which includes analyzing a signal message when a message transfer unit (part) (MTP) receives a signal message and determining a route of a final destination of the received signal message, selecting a link for transferring a signal message at a link set of the determined route based on a link determination history and link determination data and transferring a signal message through the selected link. The method may further comprise updating the link determination history and link determination data based on the selected link. The message transfer preferably unit includes a message discrimination unit, a message distribution unit and a message routing unit for distributing a signal traffic to an available route at each signal transfer point. The method may further comprise updating the link determination history and link determination data based on the selected link.

To achieve the above objects, there is provided a signal traffic routing method for a signaling network, for example, a No. 7 signaling network, according to a preferred embodiment of the invention which includes receiving a signal message at a signal transfer point, analyzing a routing label of the receiving message and determining the final destination, analyzing whether the final destination of the received signal message is a local system based on a result of the analysis, transferring the received signal message to the message routing unit when the final destination is not the local system, setting a signal route for transferring the signal message using a SLS of the routing label by the message routing unit, selecting a link of the signal message in the link set of the set route and determining a link using the link determination history and link determination data, and updating the link determination history data based on the determined link. The message transfer unit preferably includes a message discriminating unit, a message distributing unit and a message routing unit.

To achieve the above objects, there is provided a signal traffic routing apparatus for a signal network, comprising means for analyzing a signal message when a message transfer unit receives a signal message and determining a route to a final destination of the received signal message, means for selecting a link for transferring a signal message at a link set of the determined route based on a link determination history and link determination data and means for transferring a signal message through the selected link. The message transfer unit preferably comprises message distributing means for transferring a signal message to a user part of the local system message discrimination means for analyzing a received message and checking whether a final destination of the message is a local system and message routing means for routing the message to a route connected with a neighboring signal transfer point to transfer the message to a final destination. The apparatus may further comprise means for updating the link determination history and link determination data based on the selected link.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
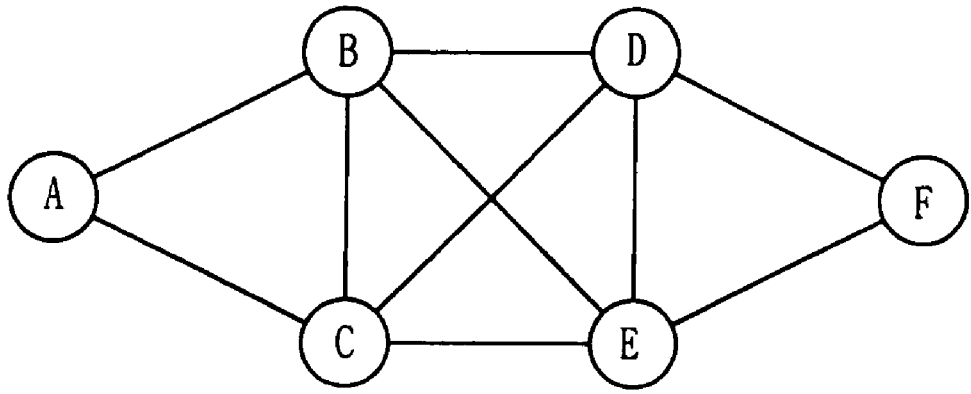
FIG. 1 is a block diagram schematically illustrating a No. 7 signaling network.
Figure 3:
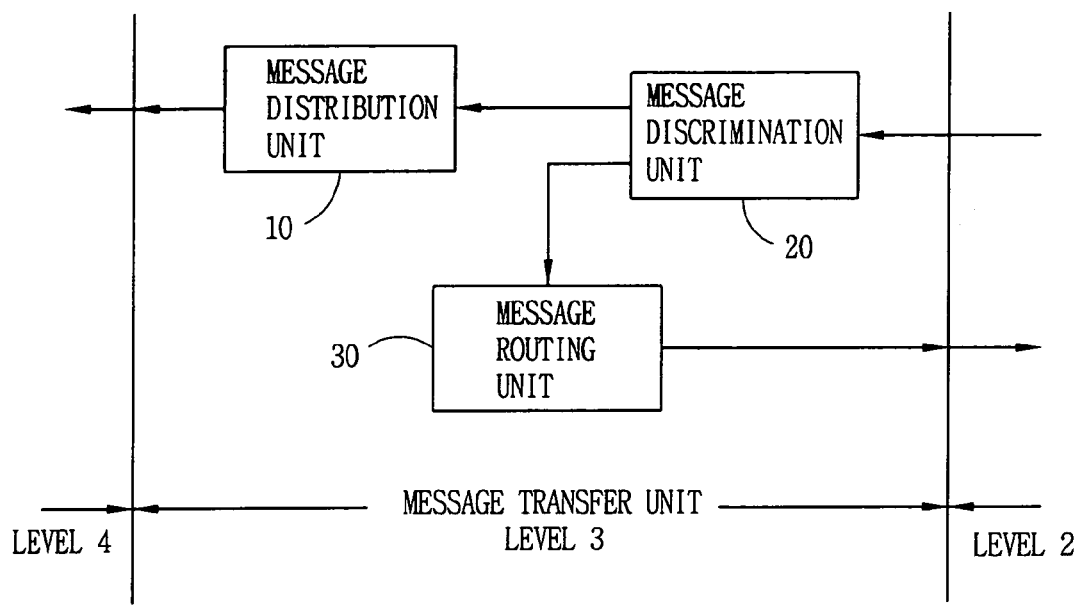
FIG. 3 is a drawing schematically illustrating a level 3 of a message transfer unit (part) according to a preferred embodiment of the invention.

Since the construction of a No. 7 signaling network in which a link selection method according to the invention is similar to the No. 7 signaling network shown in FIG. 1, the construction of the invention will be explained with reference thereto. FIG. 3 is a view illustrating the construction of a level 3 of a message transfer unit (part). The message transfer unit (part) (hereinafter called as "MTP") is capable of distributing a traffic to available routes at each signal transfer point of a corresponding No. 7 signaling network. As shown in FIG. 3, the MTP includes a message discrimination unit (part) 20, a message distribution unit (part) 10 and a message routing unit (part) 30.

The message distribution unit 10 transfers a signal message to a local user part (UP). The message discrimination unit 20 analyzes a message received from the MTP level 2 and checks whether the final destination of the message is a local system or not. The message routing unit 30 routes the message to the route connected with the neighboring signal transfer point for transferring the message to the final destination.

The signal traffic routing method in the No. 7 signal transfer point according to a preferred embodiment of the invention preferably includes receiving a signal message by the message transfer unit (MTP), analyzing a routing label of the signal message and determining a route of the final destination of the received signal message. The method preferably further comprises determining a link of a link set of a route determined based on a link determination history and link determination data and transferring a received signal message through the selected link. The method may further comprise updating a link determination history and link determination data based on the selected link.

Figure 2:
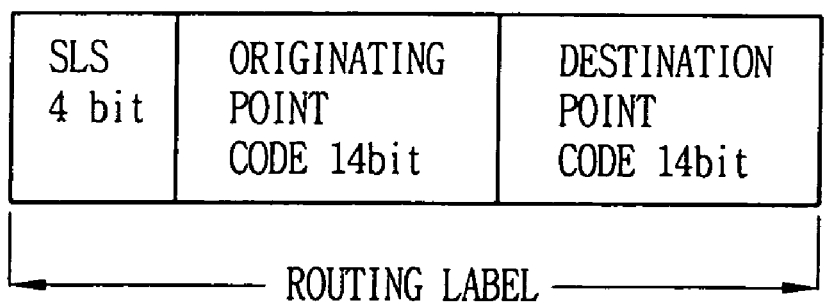
FIG. 2 is a drawing schematically illustrating a signal message routing label in the related art.
Figure 4:
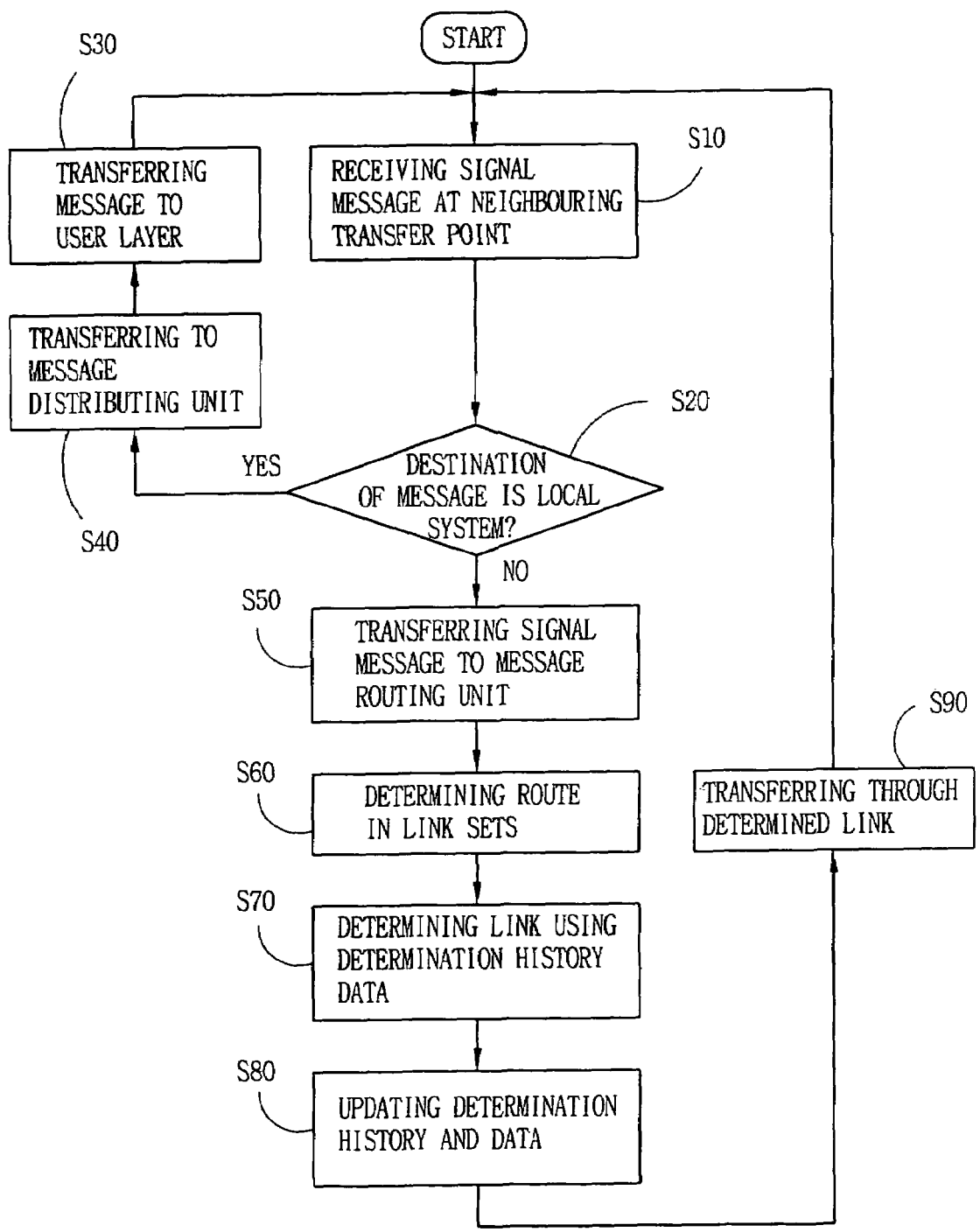
FIG. 4 is a flow chart schematically illustrating a signal traffic routing method in a No. 7 signaling network according to a preferred embodiment of the invention.

FIG. 4 is a flow chart schematically illustrating a traffic routing method in a No. 7 signaling network according to a preferred embodiment of the invention. When a signal message is received at a signal transfer point of the No. 7 signaling network in step S10, the message discrimination unit 20 of a corresponding MTP level 3 analyzes the routing label of FIG. 2 and checks whether the final destination of a corresponding message is a local system or not in step S20.

As a result of the step S20, if the final destination of a corresponding message is the =local system, the received signal message is transferred to the message distribution unit 10 in step S30. In this case, the message distribution unit 10 distributes a corresponding message to the level 4 of the user unit (part) (UP) of the local system and waits for the next message.

As a result of the step S20, if the final destination is not the local system, the received signal message is transferred to the message routing unit 30 in step S50, and the message routing unit 30 routes a message to a neighboring signal transfer point for transferring a corresponding message to the final destination. The message routing unit 30 determines a route based on the destination point of the message using the SLS of the routing label in step S60. In addition, a link is selected for transferring an actual signal message in the link set of the route determined in the step S60, and a link of a link set is determined using the link determination history and link determination data in step S70.

The link determination history and link determination data are updated based on the link selected in the step S70 after the link is determined for transferring a message using the link determination history and the link determination data in Step S80. Therefore, a signal message is transferred through the link determined in the step S70. When transferring a signal message at each signal transfer point, since the link determination history and the link determination data are updated based on the selected link, the traffic may be distributed to all available links of the link set so that it is possible to transfer a signal message to the final destination.

As described above, in order to transfer the signal message to the next signal transfer point, the link selection is generated, and after the message is transferred to the selected signal link, the SLS value transferred to the determination history data is stored.

In addition, at the signal transfer point, when transferring the next signal message, it is possible to prevent the signal message from being transferred to one link among a plurality of the links with reference to the determination history data. Here, the link determination history is used for implementing a routing operation through the same link in the case that the signal message having the same SLS does not have a state variation in the signal network for thereby obtaining a certain delivery sequence of the signal message. In addition, the link selection data is a variable which represents an available link used when selecting a certain link in the next time.

In addition, when the signal message is transferred from the signal transfer point to the next signal transfer point, the link selection data sequentially instructs which signal links will be used. Therefore, in the case where the signal message, which will be transferred, does not have a previously sent specific signal link selection value, the message is routed using the signal link instructed by the link selection data with reference to the determination history data.

As an inner variable used for selecting the link using the signal message routing unit 30, there are a SLK_SELECTOR, which represents an inner link determination data; a MSG_HISTORY_LKS, which is a link determination history that represents a SLK_SELECTOR value (integer value) based on sixteen SLSs; and a FOUND_IN_MSG_HISTORY_LKS which represents whether a routing operation with respect to the current message is performed based on the MSG_HISTORY_LKS. The value 0 (zero) in the SLK_SELECTOR value of the MSG_HISTORY_LKS represents that a signal message having a corresponding SLS value is not routed in a corresponding link set, and the remaining values represent that a signal message having a corresponding SLS is routed through a corresponding link.

Figure 5:
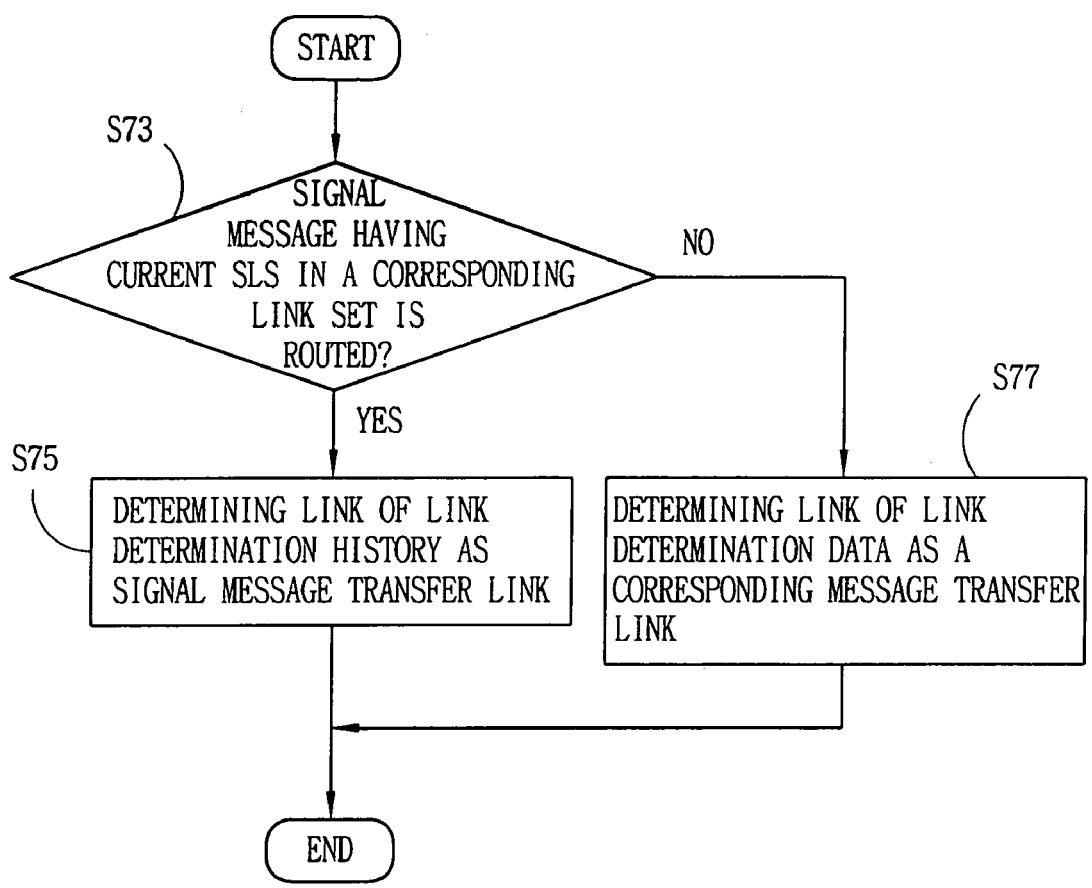
FIG. 5 is a flow chart schematically illustrating a signal link determination process for a signal traffic routing method in a No. 7 signaling network according to a preferred embodiment of the invention.

FIG. 5 is a flow chart schematically illustrating a link determination process of a link set in a signal traffic routing method in a No. 7 signaling network according to a preferred embodiment of the invention. At the signal transfer point of the No. 7 signaling network, assuming that one SLS among 0000~1111 is Z when routing the signal message, the route is determined based on the route selection method of the message routing unit 30. Also, the MSG_HISTORY_LKS is checked to determine a link in the link set of the determined route. Further, it is checked whether the signal message having Z of the SLS in a corresponding link set as a result of the check is routed in the past in step S73.

As a result of the check, if the signal message having Z of the SLS at a corresponding link set is routed in the past as a result of the check of the step S73, the link corresponding to the MSG_HISTORY_LKS is determined as a link for transferring the message in step S75. As a result of the check, if the signal message having Z of the SLS is not routed in a corresponding link set in the past, the link corresponding to the SLK_SELECTOR is determined as a link for transferring the message in step S77.

The method according to a preferred embodiment of the invention for updating the MSG_HISTORY_LKS and SLK_SELECTOR will be explained with reference to the following computer algorithm:

If FOUND_IN_MSG_HISTORY_LKS then
{/* in the case that a signal message routing operation is performed based on MSG_HISTORY_LKS */
The next available link except for SLK_SELECTOR:
=MSG_HISTORY_LKS} else
{/* in the case that a signal message routing operation is performed based on SLK_SELECTOR;
SLK_SELECTOR:=next_available_slk;/* a circulation type to a pointer of the next available link*/}

The above-described computer algorithm will now be explained in detail. When the signal message routing operation is performed based on a link of the link determination history, namely, the link of the link determination history is determined as a signal message transfer link, the link determination history is determined to be a previous value, and the link determination data is updated based on the next available link except for the link determination history for increasing an availability of the link. In addition, in the case that the signal message routing operation is performed based on the link of the link determination data, namely, the link of the link determination data is determined as the signal message transfer link, the link determination history becomes the current link determination data, and the link determination data is updated by the next available link.

MSG_HISTORY_LKS and SLK_SELECTOR are updated in the above-described manner, and reception of the next signal message is delayed.

According to the signal traffic routing method in the No. 7 signaling network, in the case that more than two links are available in the link set of the route from each signal transfer point of the No. 7 signaling network to a certain destination point, the link is determined using the link determination history and link determination data, so that the signal traffic is distributed to all available links of the link set. Further, it is possible to prevent the signal traffic from being concentrated at a certain signal link. In addition, it is possible to enhance an availability and reliability of the signaling link of the No. 7 signaling network.

Although a preferred embodiment of the invention have been disclosed for illustrative purposes, those skilled in the art will appreciate that various modifications, additions and substitutions are possible, without departing from the scope and spirit of the invention as recited in the accompanying claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A signal traffic routing method for a signaling network, comprising:
   receiving a signal message at a signal transfer point, analyzing a routing label of the received message, and determining the final destination;
   analyzing whether the final destination of the received signal message is a local system based on a result of the analysis;
   transferring the received signal message to a message routing unit when the final destination is not the local system;
   setting a signal route for transferring the signal message using a Signaling Link Selection of the routing label;
   selecting a link for the signal message from the link set of the set route using link determination history and link determination data; and updating the link determination history data based on the selected link, wherein selecting the link comprises:
  checking the link determination history to determine whether the signal message is to be routed based on the same Signal Link Selection as a previous Signal Link Selection and routing the signal message through the corresponding link from the link determination history when the signal message has been previously routed using the same Signal Link Selection; and
  routing the signal message through a next available link excluding the link from the link determination history when the signal message has not been previously routed using the same Signal Link Selection.

2. The method of claim 1, wherein the method is performed by a message transfer unit comprising a message discriminating unit, a message distributing unit, and the message routing unit.

3. The method of claim 1, wherein said routing label comprises:
  a signaling link selection bit;
  an originating point code; and
  a destination point code.

4. The method of claim 1, further comprising:
  transferring the received signal message to a user part when the final destination of the received signal message is a local system.

5. The method of claim 1, wherein the link determination history comprises a variable representing that a signal message having a corresponding label is routed through a corresponding link, and said link determination data comprises a variable representing an available link used when determining the next link.

6. The method of claim 1, wherein the method is performed by a message transfer unit comprising:
  a message distributing unit that transfers a signal message to a user part of the local system;
  a message discriminating unit that analyzes a message received from a message transfer unit and checks whether a final destination of the message is a local system; and
  the message routing unit which routes the message to a route connected with a neighboring signal transfer point to transfer the message to the final destination.

* * * * *